Oct. 8, 1968  J. W. ECKENWILER ET AL  3,405,023
TIRE BUILDING DRUM
Filed May 19, 1964  4 Sheets-Sheet 1
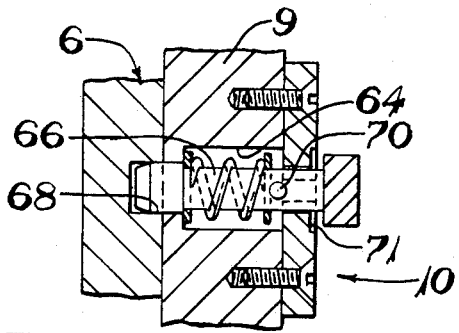
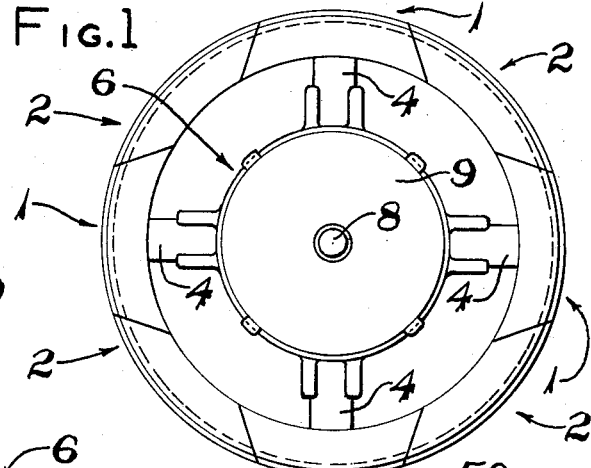
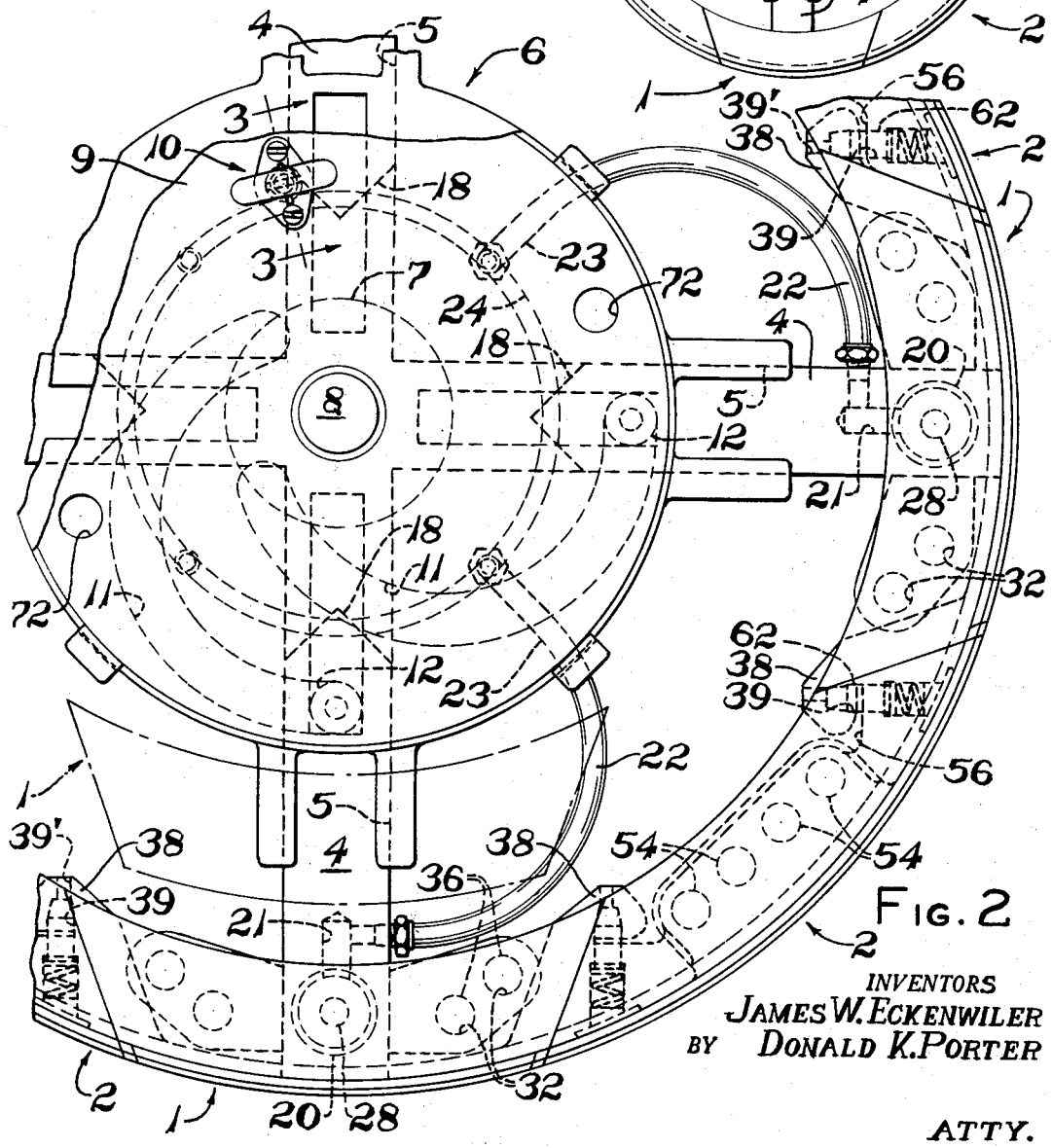
INVENTORS
JAMES W. ECKENWILER
DONALD K. PORTER
BY
ATTY.

INVENTORS
JAMES W. ECKENWILER
BY DONALD K. PORTER

ATTY.

INVENTORS
JAMES W. ECKENWILER
BY DONALD K. PORTER

ATTY.

United States Patent Office 3,405,023
Patented Oct. 8, 1968

3,405,023
TIRE BUILDING DRUM
James W. Eckenwiler, Phoenix, Ariz., and Donald K. Porter, Cuyahoga Falls, Ohio, assignors to The B. F. Goodrich Company, New York, N.Y., a corporation of New York
Filed May 19, 1964, Ser. No. 368,480
17 Claims. (Cl. 156—415)

ABSTRACT OF THE DISCLOSURE

A radially collapsible tire building drum having a plurality of circumferentially spaced sectors having alternately expandable sectors to permit collapse of the drum and wherein the sectors are axially expandable and contractible.

This invention relates to a tire building drum and more particularly to a new and improved collapsible building drum.

In the manufacture of pneumatic tires in the flat band configuration, plies of cord reinforced elastomeric sheets are built up on the surface of a drum to form a tire carcass. In addition, the operation requires the application of the beads, sidewalls and tread. Such building up of the tire carcass may be performed in steps on different drums wherein each step or series of steps can use a specially constructed drum or equivalents thereof. In such instances where different drums are used for different operations, less difficulty is encountered in the handling of the carcass because such drums are designated specifically for the operation to be performed. In order to economize and expedite the manufacture of such carcasses it is desirable to provide a drum which has several forms of adjustability to make one drum support the carcass for the entire sequence of steps in tire building. However, difficulty has been encountered in providing a satisfactory collapsible drum which permits the quick removal of the tire carcass therefrom after the forming of the toroidal shape because of the interference between the beads and the drum. Such adjustability has been generally directed to axial or radial expansion for use on smaller type tires; however, such collapsing drum had limited flexibility for use on larger size tires such as truck and bus tires because of the tremendous difference in dimension between diameter and axial length of the drum as well as between the outside diameter of the drum and the inside diameter of the tire beads.

The present invention provides a collapsible tire building drum that has a plurality of spaced radially extensible sectors which cooperate with removable sectors to define a tire building surface wherein such sectors are axially expansible as a unit as well as axially adjusable to accommodate tires of different sizes. Such drum facilitates radial collapsing so that it will have a reduced diameter to permit the quick removal of the tire carcass from the drum proper.

It is accordingly a general object of the invention to provide an improved tire building drum.

A further object of this invention is to provide a new and improved tire building drum which is collapsible to enable the tire to be removed therefrom.

Another object of this invention is to provide an improved collapsible tire building drum that accommodates large size tires.

It is a further object of this invention to provide a radially and axially expansible drum.

Another object of this invention is to provide a collapsible tire building drum having an improved expanding and collapsing mechanism that accurately positions the working surfaces of the drum.

Yet another object of this invention is to provide a collapsible drum having symmetrical construction such that the parts may be readily interchanged and/or replaced.

Yet another object of this invention is to provide a drum that is radially and axially collapsible, adjustable for building tires of different width having means to facilitate the shaping of the green tire into a toroid.

These and other objects of the invention will become more apparent upon consideration of the following detailed description of a preferred embodiment thereof, when taken in conjunction with the following drawings, in which:

FIG. 1 is an end view of a tire drum illustrating the fixed and removable segments.

FIG. 2 is a fragmentary end view of the tire drum showing the locking means for the fixed and removable segment, and a scroll plate.

FIG. 3 is an enlarged cross-sectional view of latch means taken along line 3—3 of FIG. 2.

Figure 4:
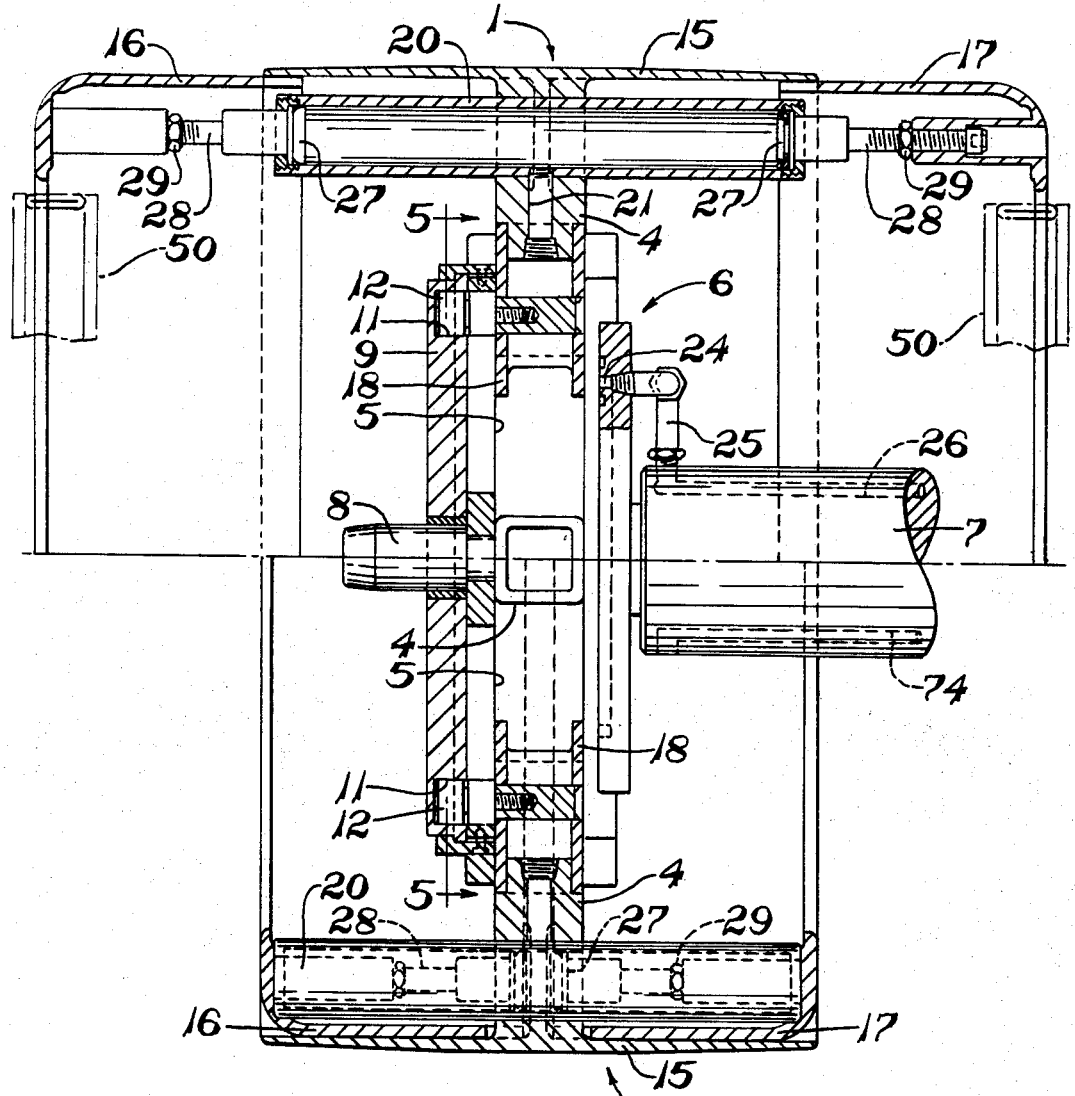
FIG. 4 is a side-elevational cross-sectional view of the drum showing the fixed segments in an axial expanded and an axial contracted position.

In the drawings, FIG. 1 discloses a tire building drum having a plurality of circumferentially spaced fixed drum segments 1 which cooperate with a plurality of circumferentially spaced removable drum segments 2 to define a continuous smooth cylindrical building surface. A tire band comprising a plurality of rubberized fabric plies are assembled to form a tire body on the drum surface. Each fixed sgment 1 has a radially depending leg member 4 which is slidably guided in a recess 5 (FIGS. 4 and 2) of the drum hub indicated generally as 6. The drum hub 6 is mounted on a shaft 7 driven by a suitable drive means. Shaft 7 has a reduced end portion 8 which acts as a pilot. Journalled for rotation on end portion 8 is a scroll plate 9 (FIGS. 4 and 5) suitably connected to the drum hub 6 as by latch means 10 to be described (FIGS. 2 and 3). Scroll plate 9 has a plurality of cam grooves 11 which are crescent shaped and extend generally from the outer edge of plate 9 toward the central position thereof. Each leg member 4 has a cam follower member 12 which is slidingly received by one of the cam grooves 11. Rotation of the scroll plate 9 relative to the hub 6 and the leg members 4 causes the respective follower members 12 to be cammed inwardly by the respective cam grooves 11 to thereby move the fixed segments 1 along with leg members 4 radially inwardly on drum hub 6 to a collapsed condition. Rotation of the scroll plate 9 in the reverse direction relative to hub 6 cams the follower members 12 outwardly to thereby move the fixed segments 1 into an expanded condition.

The fixed segments 1 are similar in all respects, accordingly only one fixed segment 1 will be described wherein like reference numerals designate like parts throughout.

Figure 5:
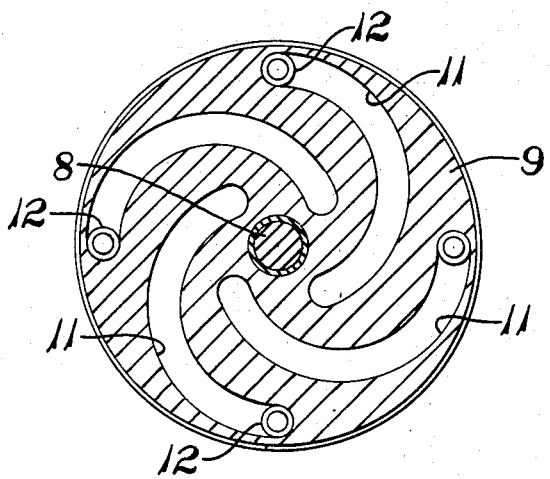
FIG. 5 is a cross-sectional view of the scroll plate taken along line 5—5 of FIG. 4.
Figure 9:
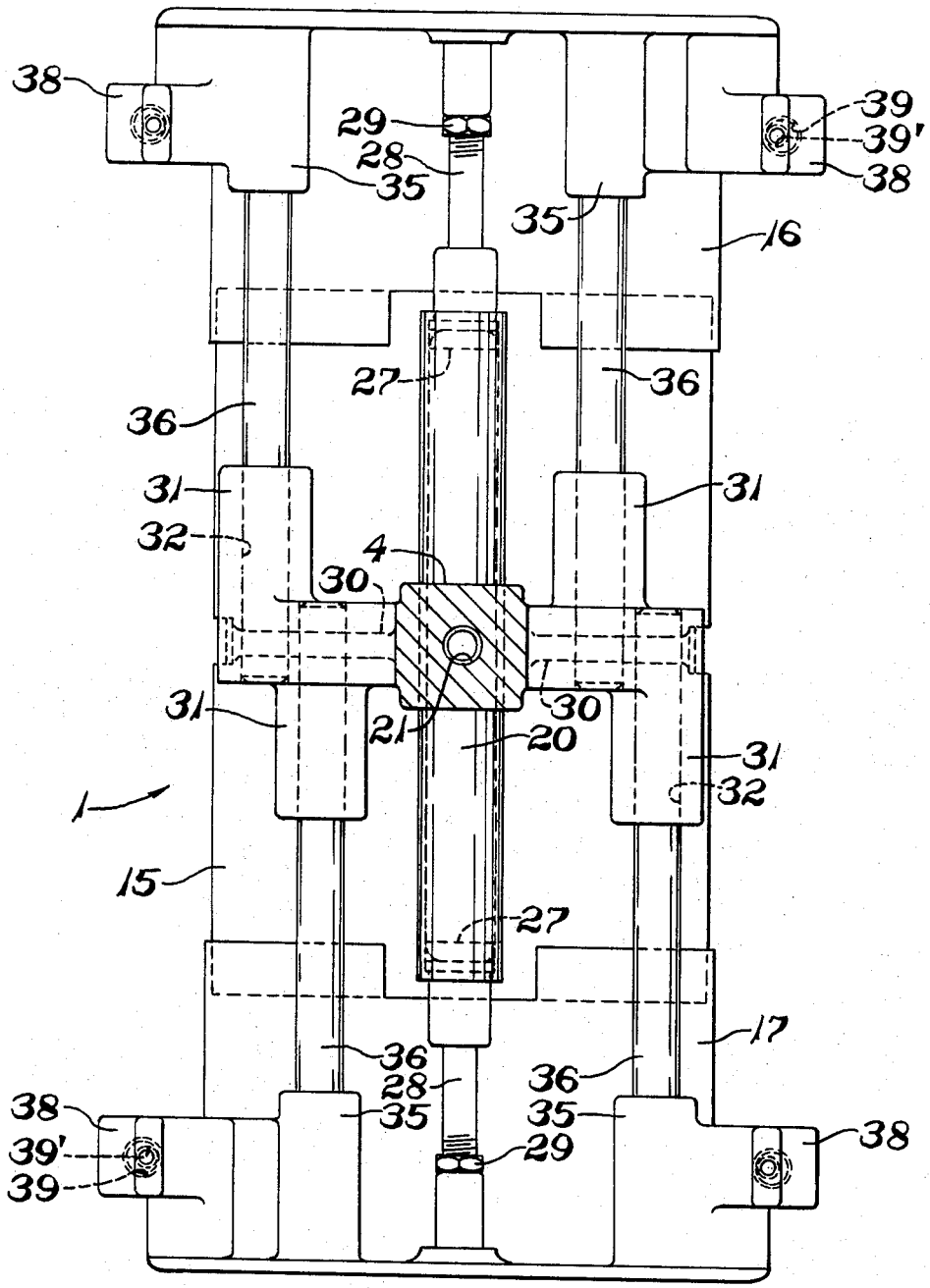
FIG. 9 is a plan view of the fixed segment taken from the underside of the drum.

Fixed segment 1 as clearly shown in FIGS. 4 and 9 has a central arcuate section 15 and a pair of complementary spaced movable end arcuate sections 16 and 17. The leg member 4 extends downwardly from the central inner wall surface of the central arcuate section 15. The lower end portion of each leg member 4 is tapered to provide an apex 18 such as to facilitate the mating of the respective sides of the apexes 18 upon collapsing of the drum. Suitably mounted on leg member 4 adjacent the central section 15 of the fixed segment 1 is a double acting cylinder 20 having its longitudinal axis parallel to the longitudinal center line of shaft 7. Fluid pressure is supplied to the central portion of cylinder 20 via a passageway 21 which is connected to a suitable pressure source via a conduit 22 (FIGS. 4 and 2), passageway 23, arcuate recess 24, conduit 25 and a passageway 26 that extend through shaft 7. Cylinder 20 has a pair of opposed piston heads 27 connected via respective threaded rods 28, and lock nuts 29 to the respective end sections 16 and 17. The respective end sections 16 and 17 are adjusted relative to the central section 15 upon loosening of lock nuts 29, rotating threaded rod 28 relative to the end section and thereafter tightening of lock nuts 29 against the end sections 16 and 17. Upon the release of pressure on the head end of the pistons 27—27 of cylinder 20 through suitable control means, the respective end sections 16 and 17 are adapted to be moved inwardly toward each other into the position shown at the bottom of FIG. 4. Means may be provided to retract the respective end sections 16 and 17 by providing suitable control means to pressurize the rod ends of cylinder 20 while simultaneously releasing the pressure on the head end of cylinder 20. Central section 15 of segment 1 has a web portion 30 connecting the leg member 4 to spaced bosses 31 (FIG. 9). Each boss 31 has a bore 32 whose axis is parallel to the axis of cylinder 20. The respective end sections 16 and 17 have bosses 35, wherein each boss 35 supports a longitudinally extending guide rod 36 which is slidingly received by the bore 32 of boss 31 associated therewith. The guide rods 36 cooperate with the bores 32 to maintain the end sections 16 and 17 in alignment with the central section 15. The respective end sections 16 and 17 each have a pair of spaced flanged portions 38 (FIGS. 9 and 2) wherein each flanged portion 38 has a tapered bore 39 (FIG. 2) that extends from the lower surface inwardly for a purpose to be set forth. Flanged portion 38 has a threaded bore 39' communicating with the tapered bore 39 to provide a means to remove the removable segments 2 in a manner to be described.

The removable segments 2 are similar in all respects. Accordingly, only one segment 2 will be described wherein like reference numerals designate like parts throughout.

Figure 6:
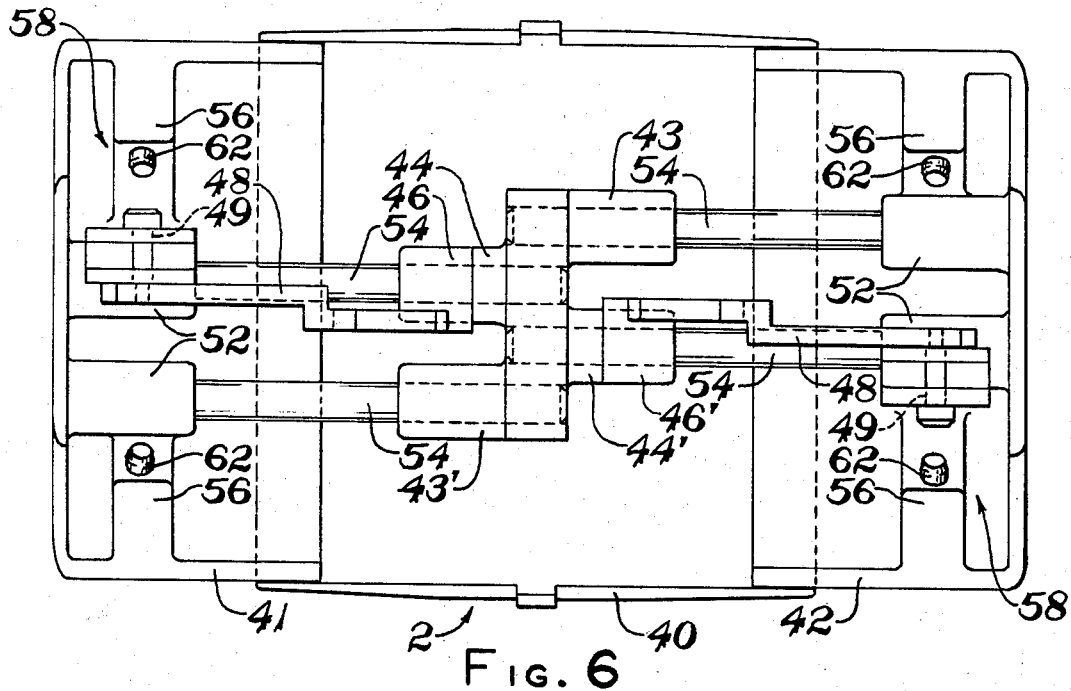
FIG. 6 is a plan view of a removable segment of the drum taken from the underside of the drum.
Figure 7:
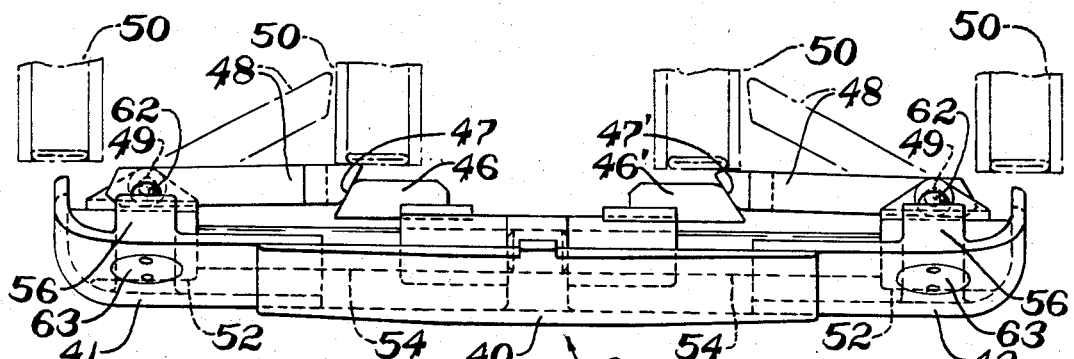
FIG. 7 is a side elevational view of the removable segment.

Removable segment 2 has a central arcuate section 40 (FIG. 6) and a pair of complementary spaced movable end arcuate sections 41 and 42. Central arcuate section 40 has a web portion on its inner central wall section connecting spaced bosses 43–43' and 44–44'. Bosses 43 and 43' have a bore extending longitudinally therethrough for a purpose to be set forth. Bosses 44 and 44' have raised portions 46, 46', respectively, which raised portions 46 and 46' have tapered side portions 47 and 47' (FIG. 7). The inner central edge portion of each end section 41 and 42 has one end of a link member 48 pivotally mounted thereon as via a pivot pin 49. The other end of link members 48 abuttingly engages the tapered side portions 47 and 47' respectively of the associated raised portions 46 and 46' to cooperate with movable members 50 (as shown in phantom in FIG. 7) to provide additional rotational support to the drum. If desired link member 48 may be connected to the raised portion 46 via a magnetic attraction to thereby maintain a compact structure.

The respective end sections 41 and 42 have bosses 52 which support longitudinally extending guide rods 54, which guide rods 54 are slidingly received by the bores on bosses 43, 43', 44 and 44'. The guide rods 54 cooperate with such bores to maintain end sections 41 and 42 in alignment with the central section 40. The pivot pins 49 for the link members 48 are supported by certain of the bosses as shown in FIG. 6.

Figure 8:
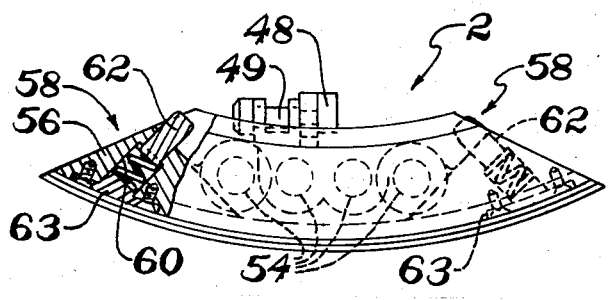
FIG. 8 is an end view of the removable segment with a portion broken away for clarity.

The respective corner portions of end sections 41 and 42 have raised inverted V-shaped projections 56 which house latch means 58 (FIG. 8). The respective latch means 58 cooperate with associated bores 39 in the fixed segments 1 to maintain the segments 1 and 2 in a continuous smooth cylindrical building surface. Each V-shaped projection 56 has a bore 60 which houses a spring biased detent pin 62, which detent 62 is adapted to project into bore 39. Detent pin 62 is suitably retained within the bore 60 by means of a removable plate 63. To assure positive alignment between the respective segments 1 and 2, the respective central sections may be connected in a mortise joint as shown in FIGS. 6 and 9.

Latch means 10 (FIGS. 2 and 3), previously referred to, comprises a bore 64 in scroll plate 9 which bore 64 houses a spring biased detent pin 66. The end portion of detent pin 66 is adapted to register with a bore 68 (FIG. 3) in hub 6 to maintain the scroll plate 9 and the drum hub 6 in fixed relationship as shown in FIG. 2. Detent pin 66 has a cross pin 70 which extends transversely therethrough positioned within a recess 71 located in plate 9. Twisting of pin 66 rotates cross pin 70 within bore 64 to lock the scroll plate 9 to the hub 6. Upon rotation of pin 66 to align cross pin 70 with recess 71 followed by upward movement of pin 66 and twisting such detent pin 66, the cross pin 70 maintains detent pin 66 out of bore 68 to allow relative movement between drum hub 6 and scroll plate 9. Upon rotation of scroll plate 9 relative to drum hub 6, as by a spanner wrench, the grooves 11 on scroll plate 9 cam the respective leg members 4 radially inwardly via their connection to the respective follower members 12 until the apexes 18 of the leg members 4 abuttingly engage each other. To maintain a fixed relationship between such drum hub 6 and the scroll plate 9 with the fixed segments in collapsed condition, drum hub 6 has a bore 72 (FIG. 2) which is adapted to register with the end portion of detent pin 66 upon twisting of such detent pin 66 to align the cross pin 70 with recess 71.

In operation of the drum, assume initially that the drum is collapsed wherein fixed segments 1 are radially retracted such that their apexes 18 are in abutting relationship. To expand such drum, latch means 10 is operated via detent pin 66 to allow relative movement between scroll plate 9 and drum hub 6 in the manner described above. Relative movement is imparted to the plate 9 through the use of any suitable spanner wrench which is adapted to engage notches on the plate 9 and hub 6 to provide the necessary leverage such that the respective leg members 4 of the fixed segments 1 are moved radially outwardly to the position shown in FIGS. 2 and 4.

Assuming that the respective end sections 16 and 17 are in the retracted position as shown in full lines at the bottom of FIG. 4, the respective flanged portions 38 (FIG. 2) are positioned to abuttingly engage the V-shaped projections 56 of the removable segments 2. To assemble the drum, the removable segments 2 are positioned relative to the fixed segments 1 such that the end portions of spring biased detent pins 62 project into the respective bores 39 to present a continuous smooth cylindrical surface. It will be noted in FIG. 2, that once removable segments 2 are latched into position, the spring biased detent pins 62 maintain the segments 1 and 2 in fixed relationships. Thereafter, upon pressurization of hydraulic cylinder 20 from a suitable source via passageway 26 the respective piston heads 27, their rods 28 and their associated end sections 16 and 17 move outwardly away from the central section 15. Simultaneously with such action, the end sections 41 and 42 move outwardly away from the central section 40 since the respective end sections 41 and 42 are securely connected to the end sections 16 and 17. Such drum in the fully expanded condition is adapted to accommodate the building of a tire. After a tire carcass is completely built on the drum, movable members 50, which may be inflated, are moved axially into the position shown in phantom lines in FIG. 4 to seal the tire band such as to define a closed air pressure chamber therebetween. As shown in FIG. 4, a suitable passageway 74 connects to such closed air chamber to provide means by which a pressurized fluid may be introduced thereto. Upon pressurization of such air chamber, the tire band may be shaped into a toroid form since sufficient clearance is provided between the fixed and removable segments 1 and 2 to permit the passage of air to provide the shaping of the tire band. In order to remove the tire from the drum, latch means 10 is positioned as described above to permit the relative movement between scroll plate 9 and the drum hub 6. Upon counterclockwise movement of scroll plate 9 as viewed in FIG. 2 relative to the stationary drum hub 6, grooves 11 cam the followers 12 and leg members 4 along with the fixed segments 1 radially inwardly until the apexes 18 are in abutting relationship. The removable sectors are retained within the formed tire band during the collapsing of the drum through the reliance of gravity due to their weight. Clamp means to assist the formed tire band to retain the movable segments in their spaced relationship may consist of a vise type clamp placed manually on the tire, with such clamps having movable jaws engageable with the removable segments to retain such removable segments in their orientated position in the formed tire.

In order to collapse the drum without having a tire thereon, thumb screws are threaded into the respective threaded bores 39' until such screws depress the spring biased detent pins 62 so that the pins no longer engage their respective bores 39 in the fixed segments. Such action permits the removal of the segments 2.

It should be understood, of course, that the foregoing disclosure relates to only a preferred embodiment of the invention and that numerous modifications or alterations may be made therein without departing from the spirit and the scope of the invention as set forth in the appended claims.

We claim:

1. A collapsible building drum comprising a plurality of arcuate segments defining a cylindrical building surface, a rotatable hub operatively supporting said segments and mounted centrally therein, and cam means operatively connected between said hub and certain of said segments but less than all of said segments operative upon relative movement to said hub for collapsing and expanding said certain segments whereby the building drum may be collapsed.

2. A collapsible building drum comprising a plurality of arcuate segments defining a circular building surface, a rotatable supporting hub within said segments, alternate ones of said segments having radially inwardly extending members guided by radially extending grooves in said hub, the remaining ones of said segments being supported solely by said alternate segments, and cam means mounted on said hub and operatively engaging said members for selectively moving said certain segments only radially inwardly and outwardly.

3. A collapsible building drum comprising in combination a plurality of arcuate segments defining a circular building surface, a central axial supporting hub within said segments, means on said segments for expanding all of said segments axially as a unit, and means on said hub operatively connected to alternate ones of said segments only for expanding and contracting radially said certain segments to thereby collapse and expand the drum.

4. A collapsible building drum as set forth in claim 3 wherein said hub has means for supplying a pressurized fluid to the central portion of the drum radially inwardly of said segments whereby said last-mentioned means cooperates with clearance between said segments to accommodate the shaping of building bands into a toroidal shape.

5. A collapsible building drum comprising a plurality of arcuate segments defining a circular building surface, a central axial supporting hub within said segments, each of said segments having a central section and axially spaced end sections, means on alternate ones of said segments operative for extending all of said end sections axially away from said central section to define an axially expanded drum, and other means on said hub operatively connected to said alternate segments only for moving said alternate segments radially whereby to facilitate collapsing of the drum.

6. A collapsible building drum comprising a plurality of arcuate segments defining a cylindrical building surface, a rotatable hub supporting only certain ones of said segments for positive radial movement, means on said hub for moving positively only said certain segments radially relative to said hub, each of said segments having end sections that are axially movable relative to each other in opposite directions, each of said certain segments having means for expanding said end sections associated therewith in opposite axial directions, and all of said end sections being removably latched together wherein the respective circumferentially extending end sections are movable axially as a unit.

7. A collapsible building drum as set forth in claim 6 wherein said hub has means for supplying air outwardly therefrom to accommodate the shaping of building bands into a toroidal shape upon axial inward movement of said end sections.

8. A collapsible building drum comprising a central axial supporting hub, a plurality of circumferentially spaced arcuate segments operatively connected to said hub for guided rectilinear radial movement relative to the axis of rotation of said hub, said hub supporting a scroll plate mounted thereon for selective rotation relative thereto, said segments having follower means operatively connected to cam means on said scroll plate wherein rotation of said scroll plate operates to move said segments radially inwardly or outwardly, other circumferentially spaced arcuate segments cooperative with said first-mentioned segments to define a continuous cylindrical surface, and said other segments being removably latched on said first-mentioned segments.

9. A collapsible building drum as set forth in claim 8 wherein said hub has latch means cooperative with said scroll plate to selectively secure said plate to said hub to provide simultaneous rotation therebetween.

10. A collapsible tire building drum comprising a hub and an outer shell, said outer shell comprising a plurality of circumferentially spaced segments defining a first set of segments alternating with a like number of circumferentially spaced segments defining a second set of segments, means interconnecting adjacent ones of said segments, said second set of segments being supported solely by said first set of segments and means on said hub operatively connected to said first set of segments for expanding and contracting radially said first set of segments whereby the drum may be collapsed and expanded.

11. A collapsible tire building drum as set forth in claim 10 wherein said means interconnecting adjacent ones of said segments comprises spring biased detent means on said second set of segments which are cooperative with recesses on said first set of segments to maintain said segments in fixed circumferentially spaced relationship to define a continuous cylindrical tire building surface.

12. A central tire building drum comprising a hub and an outer shell, said outer shell comprising a plurality of circumferentially spaced segments defining a first set of segments alternating with a plurality of circumferentially spaced segments defining a second set of segments, said first set of segments being supported by said hub, each of said segments having a central arcuate portion and spaced end arcuate portions to provide associated end portions for each said central portion, each segment having guide means interconnecting said associated end portions with said central portion for axial guided movement to said associated end sections, means on each of said central portions of said first set of segments operatively connected to said associated end portions for axially extending said first set of segments, said last-mentioned means being adjustable to provide a predetermined axial expansion of the drum to facilitate the building of different size tires.

13. A central tire building drum as set forth in claim 12 wherein each of said second set of segments have end portions with detent means operatively engaging recesses in adjacent end portions of said first set of segments to maintain said segments in a unitary cylindrical tire building surface.

14. A central tire building drum as set forth in claim 13 wherein said central arcuate portions of said first set of segments have means cooperative with means on said hub for radially extending and radially contracting said first set of segments.

15. A central tire building drum as set forth in claim 13 wherein said hub supports a scroll plate for selective rotation relative thereto, said central arcuate portion of said first set of segments having follower means operatively connected to cam means on said scroll plate wherein relative rotation of said plate is adapted to move said first set of segments radially.

16. A tire building drum comprising a hub and an outer shell, said outer shell comprising a plurality of circumferentially spaced segments defining a first set of segments alternating with a plurality of circumferentially spaced segments defining a second set of segments, each of said segments having an individual central arcuate section and axially spaced individual end arcuate sections, each central section of said first set of segments having radially inwardly extending members guided by radially extending grooves in said hub, a scroll plate supported on said hub, latch means cooperative with said scroll plate to selectively secure said plate to said hub to provide simultaneous rotation or permit relative rotation therebetween, each of said members having follower means operatively connected to cam means on said scroll plate wherein rotation of said scroll plate operates to move said first set of segments radially, means on each of said central sections of said first set of segment operatively connected to their said respective end arcuate sections for axially extending said first set of segments, said means for axially etxending said first set of segments having their longitudinal axes in parallel spaced relationship to each other and to the axis of rotation of said hub, each segment having guide means interconnecting each of said central sections with their axial aligned end sections, each of said end sections of said second set of segments having detent means operatively engaging bores in adjacent end sections of said first set of segments to maintain said segments in a unitary cylindrical tire building surface, and said bores of each segment of said first set of segments have axes that are equidistant from a plane passing through the axis of rotation of said hub and which plane bisects a line normal to and joining the respective end portions of said bore to thereby facilitate the collapsing of the first set of segments while permitting said second set of segments to be retained within the carcass of a tire built on said outer shell.

17. A tire building drum as set forth in claim 16 wherein said first set of segments have threaded bores concentric with said bores in said end sections of said first set of segments to facilitate removal of said second set of segments.

References Cited

UNITED STATES PATENTS

| | | | |
|---|---|---|---|
| Re. 22,369 | 8/1943 | Bostwick | 156—415 X |
| 1,667,263 | 4/1928 | Mather | 156—414 X |
| 3,140,216 | 7/1964 | Shilts et al. | 156—417 |
| 3,178,331 | 4/1965 | Bishop et al. | 156—417 X |

HAROLD ANSHER, *Primary Examiner.*